R. H. CORNMAN.
ROTARY CUTTER.
APPLICATION FILED FEB. 19, 1915.

1,150,662.

Patented Aug. 17, 1915.

Witnesses
Harry Bucher
Chas K. Davies

Inventor
RALSTON H. CORNMAN
By Shigley & Harney
Attorneys

COLUMBIA PLANOGRAPH CO., WASHINGTON, D. C.

UNITED STATES PATENT OFFICE.

RALSTON H. CORNMAN, OF COLUMBUS, OHIO.

ROTARY CUTTER.

1,150,662.   Specification of Letters Patent.   Patented Aug. 17, 1915.

Application filed February 19, 1915. Serial No. 9,279.

*To all whom it may concern:*

Be it known that I, RALSTON H. CORNMAN, a citizen of the United States of America, residing at Columbus, in the county of Franklin and State of Ohio, have invented certain new and useful Improvements in Rotary Cutters, of which the following is a specification.

The present invention relates to improvements in rotary cutters, and particularly to the attaching means by which the removable or replaceable teeth or cutting tools are fixed to the cutter head.

The invention is designed especially for use in connection with slow-speed cutters, but is equally well adaptable for high speed cutters and in which case the teeth are permanently fixed in the tool head.

The primary object of the invention is to provide a facile, economical and efficient tool that has its cutting members compactly arranged and adjustable and a tool in which simplicity of construction as well as operation predominate.

The invention consists essentially in certain novel combinations and arrangements of parts whereby the cutting tools or teeth are removably fixed in the cutting head or disk of the rotary cutter, as will be hereinafter pointed out and claimed.

In the accompanying drawings I have illustrated one complete example of the physical embodiment of my invention constructed according to the best mode I have so far devised for the practical application of the principles of my invention.

Figure 1:
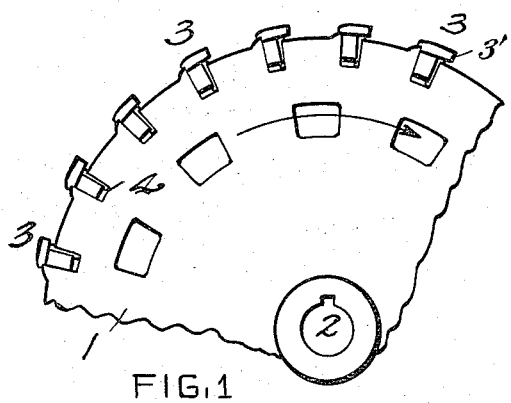
Figure 2:
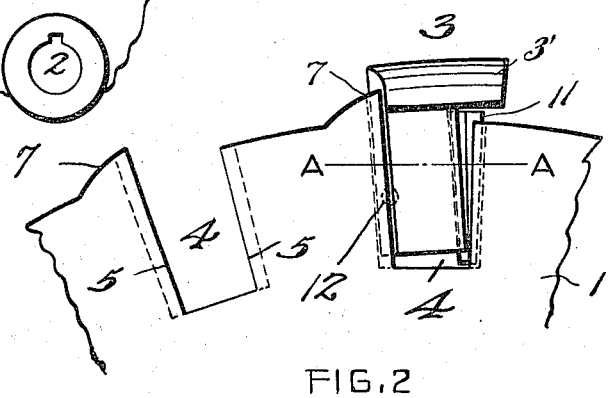
Figure 5:
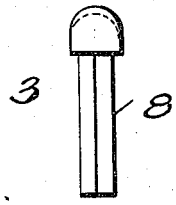
Figure 3:
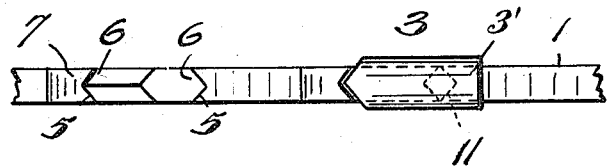
Figure 6:
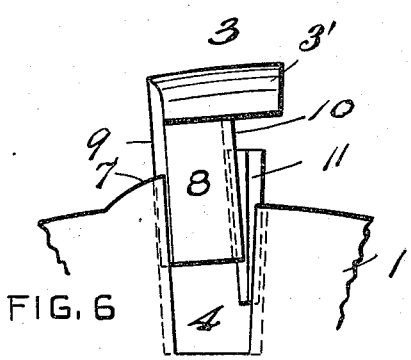
Figure 4:
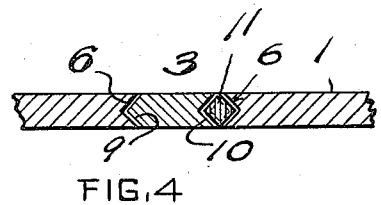

In the accompanying drawings:—Figure 1 is a view of a portion of a rotary cutter head, with several cutting tools or cutters fixed therein according to my invention. Fig. 2 is an enlarged view of a portion of the cutter head showing an unoccupied kerf and a second kerf with a cutter fixed therein. This view also shows in dotted lines a rivet that might be used in some cases. Fig. 3 is an edge view of Fig. 2. Fig. 4 is a sectional view on line A—A of Fig. 2. Fig. 5 is an edge view of one of the cutters. Fig. 6 illustrates the position of the tooth or cutting tool and its key, partly driven home.

In the preferred embodiment of the invention as used in slow speed rotary cutters, the disk or cutting head 1 is provided with the usual hub 2 and is keyed to the driving shaft as usual so that the rotary cutting head will move with the shaft, in the direction of the arrow in Fig. 1.

For the accommodation of the cutters, indicated as a whole by the numeral 3, the periphery of the round disk or cutter head 1 is fashioned with a suitable number of spaced kerfs or notches 4, 4, etc. The series of kerfs 4 are each formed with radiating or radial lines, so that the walls 5 5 of the kerfs radiate on lines from the center of the hub of the cutter head, regardless of the size of the cutter head, within certain limits. Reference to Figs. 2 and 3 especially will disclose the fact that the walls 5 5 of the kerfs are each grooved as at 6, 6, and that the grooves are wedge shaped or V-shape. At the rear side of the kerf, as the disk rotates, a lug 7 is formed which projects slightly beyond the periphery of the disk, to afford a bearing and reinforcement for the cutter beyond the periphery of the cutter head. The cutters or cutting tools, or teeth, are identical in structure and shape, being each formed with a shank 8, one edge of which is formed with a V-shape groove 9 while the opposite edge of the shank is fashioned as a V-shape rib or tongue 10. It will be noted that these elements are arranged on parallel lines, and are not radial lines, thus differing from the walls of the kerfs into which they are to be fixed.

Between the groove of the cutter shank and the forward groove of the kerf, a locking wedge shaped key 11 is designed to be driven. This key, as seen in cross section in Fig. 4, is square, transversely, as well as wedge shaped longitudinally, and the pointed end of the key, of course, is to be driven first in the grooves when locking the cutter to the head.

The cutters or teeth it will be understood are of hard tool steel, but the locking key is preferably of softer metal, in order that when the tooth and its key are driven home in a kerf, a greater frictional contact will be attained than with equally hard metals, thus fixing the tooth and wedge or key more securely in the kerf.

It will be noted that the cutter teeth 3 are each fashioned with an extension 3′ which overlaps or overhangs the wedge key, and this extension protects the wedge key when it is fixed in proper position.

In applying the tooth and wedge or key, the parts are first placed in position with their inner ends entering the grooves in the walls of the kerf and one edge of the key in the groove 9 of the cutter. The cutter and key are then driven home in usual manner, (see Fig. 6) the tongue and groove and wedge connection of the tooth, kerf wall and key, securely holding the parts in fixed relationship. The adjustment of the cutter may be determined by the length of the key. Thus, the keys are made of various lengths (all longer than the length of the shorter wall of the kerf) so that the distance the wedge projects beyond the periphery of the cutter head governs the diameter of the cutter.

The cutting face of the cutters or teeth may be any desired shape for the work intended, but the shank of the cutter and its locking key remain the same in all cases, except as noted above regarding the length of the key.

This slow speed cutter is designed especially for metal and stone work, but when the rotary cutter is adapted for wood sawing at high speed, I employ a rivet as 12 to hold the parts together. (See Fig. 2.)

What I claim is:—

The combination with a cutter head having a kerf fashioned with radially grooved walls, of a cutter having a shank with a rib in one kerf wall and a groove in the opposite edge of the shank, a rectangular wedge in said grooved shank and the other grooved wall, and a protective extension on the cutter projecting over said wedge.

In testimony whereof I affix my signature in presence of two witnesses.

RALSTON H. CORNMAN.

Witnesses:
C. F. LUCKHART,
F. M. GLICK.

Copies of this patent may be obtained for five cents each, by addressing the "Commissioner of Patents, Washington, D. C."